United States Patent
Budnik et al.

(10) Patent No.: US 8,930,758 B2
(45) Date of Patent: Jan. 6, 2015

(54) AUTOMATED TESTING OF MECHATRONIC SYSTEMS

(71) Applicants: Christof J. Budnik, Lawrenceville, NJ (US); Roberto Silveira Silva Filho, Lawrenceville, NJ (US); Stephen P. Masticola, Kingston, NJ (US)

(72) Inventors: Christof J. Budnik, Lawrenceville, NJ (US); Roberto Silveira Silva Filho, Lawrenceville, NJ (US); Stephen P. Masticola, Kingston, NJ (US)

(73) Assignee: Siemens Aktiengesellschaft, Munich (DE)

( * ) Notice: Subject to any disclaimer, the term of this patent is extended or adjusted under 35 U.S.C. 154(b) by 178 days.

(21) Appl. No.: 13/736,106

(22) Filed: Jan. 8, 2013

(65) Prior Publication Data

US 2013/0185594 A1    Jul. 18, 2013

Related U.S. Application Data

(60) Provisional application No. 61/586,949, filed on Jan. 16, 2012.

(51) Int. Cl.
*G06F 11/00* (2006.01)
*G06F 11/36* (2006.01)

(52) U.S. Cl.
CPC ........ *G06F 11/3668* (2013.01); *G06F 11/3684* (2013.01); *G06F 11/3688* (2013.01)
USPC .................. 714/27; 714/26; 714/33

(58) Field of Classification Search
CPC ............ G06F 11/2247; G06F 11/2289; G06F 11/263; G06F 11/273
USPC ............ 714/25, 26, 27, 32, 33; 703/4, 13, 20, 703/21
See application file for complete search history.

(56) References Cited

U.S. PATENT DOCUMENTS

| | | | |
|---|---|---|---|
| 6,697,880 B1 | 2/2004 | Dougherty | |
| 6,876,942 B2 | 4/2005 | Hagerott et al. | |
| 7,003,420 B2 | 2/2006 | Ur et al. | |
| 7,076,713 B1 * | 7/2006 | Hess | 714/741 |
| 7,536,277 B2 | 5/2009 | Pattipatti et al. | |
| 7,644,334 B2 | 1/2010 | Hickman et al. | |
| 8,078,567 B1 | 12/2011 | Cadick et al. | |
| 2009/0094575 A1 * | 4/2009 | Vieira et al. | 717/104 |
| 2009/0222694 A1 * | 9/2009 | Adir et al. | 714/26 |
| 2009/0249121 A1 * | 10/2009 | Kube et al. | 714/32 |
| 2009/0319830 A1 * | 12/2009 | Zander-Nowicka et al. | 714/32 |
| 2010/0005447 A1 * | 1/2010 | McCoy | 717/115 |
| 2010/0077260 A1 * | 3/2010 | Pillai et al. | 714/46 |
| 2010/0251209 A1 * | 9/2010 | Murthy | 717/104 |
| 2014/0032969 A1 * | 1/2014 | Landa et al. | 714/33 |

OTHER PUBLICATIONS

Hartmann et al., "UML-Based Integration Testing", ISSTA'00, Portland, Oregon, pp. 60-70, 2000.

* cited by examiner

*Primary Examiner* — Marc Duncan

(57) ABSTRACT

An arrangement for providing integrated, model-based testing of industrial systems in the form of a model-based test design module, a test execution engine and an automated test infrastructure (ATI) component. The ATI component includes a keyword processor that interfaces with test commands created by the design module to implement the testing of a specific industrial system. Configuration and deployment information is also automatically created by the design module and used by the ATI component to set up and control the specific industrial system being tested.

17 Claims, 3 Drawing Sheets

AUTOMATED TESTING OF MECHATRONIC SYSTEMS

CROSS-REFERENCE TO RELATED APPLICATIONS

This application claims the benefit of U.S. Provisional Application No. 61/586,949, filed Jan. 16, 2012 and herein incorporated by reference.

BACKGROUND

1. Field of the Invention

The present invention relates to automated testing of systems and, more particularly, to the integration of model-based testing with test execution platforms and automated testing frameworks particularly well-suited for providing thorough, automatic testing of complex mechatronic systems.

2. Description of the Related Art

Mechatronics is an engineering approach that manages the synergistic integration of mechanics, electronics, control theory and computer science within product design and manufacturing in order to develop, improve and/or optimize the functionality of the product design and/or a manufacturing process. Mechatronics is an increasingly important approach in many of today's industries that rely on extremely complex and heterogeneous subsystems in bringing a product to market or providing a service. For example, maintenance and control of a mechatronic-based production line facility that requires the monitoring of a variety of different machines (probably from different vendors), the software programs running the machines, the hardware controls of the machines, and the like.

As the scale of complexity of mechatronic systems continues to increase (which obviously increases testing costs), approaches that automate the execution, generation and reporting of test activities become increasingly important. In particular, software has become an important part of today's mechatronic systems. Indeed, expert predictions contemplate scenarios where the fraction of software-based system components will continue to increase without limitation, overtaking the place of pure mechanical systems in many industrial settings. The shift from mechanics to electronics and software presents different challenges in the verification, validation and certification of such systems.

Traditional engineering approaches, adopted specifically for a single aspect of these mechatronic systems in isolation (e.g., software testing vs. electro-mechanical control testing) tend to be inadequate or do not scale to the complexity involved in the development of these "systems of systems". As of now, the testing of mechatronic systems is supported by a loosely-integrated combination of commercial and industry-specific solutions including hardware abstraction frameworks, test execution engines and model-based testing tools. While these approaches individually address specific issues on different levels of abstraction, they remain essentially isolated in operation, hindering their combined adoption in industrial settings.

At times, these combinations need to be integrated in a manual fashion in order to automatically develop (or derive) test scripts from a given model, which is obviously both time consuming and expensive. The various tools that do exist for automatically creating test scripts are not well-suited for the heterogeneous collection of elements forming a mechatronic system.

FIG. 1 shows a typical prior art arrangement that uses engineering personnel to manually generate test scripts 1 that are used by a conventional test execution engine 2. As mentioned above, the development of the test scripts is extremely time consuming, as well as error-prone (particularly in terms of covering every possible situation to be evaluated). The scripts must be developed in a language suitable for use with the specific type of system used for text execution engine 2. The engineering personnel must also manually develop the specific configuration 3 of the mechatronic system under test (SUT), applying this configuration 3 to an Automated Test Infrastructure (ATI) 4. As shown in FIG. 1, execution engine 2 sends a series of tests to ATI 4 and collects results for various uses, such as modifying and updating the SUT, verifying and validating the operation of the SUT, etc.

ATI 4 focuses on providing a software interface to the specific hardware devices forming the mechatronic SUT, illustrated as device abstraction layer 7 in FIG. 1, allowing test scripts to be produced for different hardware configurations. As shown in FIG. 1, ATI 4 supports strategies such as "Hardware in the Loop" (HiL) 5 and "Simulator (or Software) in the Loop" (SiL) 6, which allow testing of incomplete, embedded and mechatronic systems under different configurations. For example, a given mechatronic SUT may be "incomplete" in terms of selected hardware components not yet ready for use, allowing for a software-based simulation of these components to be added to the system and tested accordingly.

While frameworks such as that shown in FIG. 1 address some system testing issues (such as heterogeneity, external dependencies, and the like), the process still relies on engineering personnel to develop the initial test scripts, define the configuration of the mechatronic SUT, update the configuration for different environments (i.e., "deployments") and then, possibly, update the test scripts to coordinate with the updated configurations. The need for engineering personnel to perform this manual creation of test scripts and configurations results in an arrangement that is expensive, inefficient and still prone to errors in providing verifiable results.

Thus, a need remains for an automated testing platform that is capable of handling mechatronic systems, addressing the various needs as outlined above.

SUMMARY OF THE INVENTION

The needs remaining in the art are addressed by the present invention, which relates to automated testing of systems and, more particularly, to the integration of model-based testing with test execution platforms and automated testing platforms to provide thorough, automatic testing of complex mechatronic systems.

In accordance with the present invention, an automatic testing framework is proposed that integrates model-based test design creation with both a test execution platform and a configuration-aware hardware interface testing structure, generating test environment configurations at various scales of complexity. Selected components may then build up the test environment conditions under which a given mechatronic SUT must be tested, addressing the problem of rewriting test environment configurations by automatically deriving the different environment-based configurations from the first instance of the model-based specification.

In an exemplary embodiment of the present invention, a model-based test system traditionally associated with testing software systems is improved and expanded to include languages for behavior specification, configuration specification and deployment specification. The configuration-aware hardware interface testing structure (hereinafter referred to as an "automated test infrastructure" (ATI)) is configured to include a keyword processor that interfaces with the abstract model level, providing an improved abstraction level to the inventive approach by isolating lower-level changes in various system components from the initial process of creating test scripts. Residing at an intermediate level between the test script creation and the automated testing framework are test code and deployment generators that are specific to the mechatronic system being evaluated.

A significant advantage of the testing platform of the present invention is the ability to automatically generate test environment configurations from a given model-based specification in order to evaluate the mechatronic SUT without re-coding test scripts as the configuration of the mechatronic SUT changes, or as various hardware interfaces change, or as simulators are substituted for physical devices. In accordance with the present invention, this is enabled by using the keyword processor to bind the model-based test design to the test script generation, while also using the co-generation of test scripts and configurations, supporting the co-evolution of both specification and implementation by means of automatic generation.

An exemplary method of applying integrated testing to a mechatronic system in accordance with the present invention begins by specifying the behavior of the mechatronic SUT based on use case and activity diagrams, together with the internal configuration of the mechatronic SUT (based on component diagrams) and a deployment diagram (also a component diagram). These diagrams are then interpreted by code generators within a model-based testing system to produce configuration files. The configuration files are then used by the automated test infrastructure (ATI) to appropriately program the SUT and its components, while the generated test scripts are used by a test execution engine to evaluate the SUT.

It is an aspect of the present invention that instead of manually writing test scripts, users of the automated testing platform now generate those scripts together with deployment and configuration models, using code generators specifically designed for models-based testing. The ATI uses the configuration and deployment information to load the mechanic SUT and its environment, while the test executor executes and tests the mechatronic SUT using the generated scripts. The scripts are generated in terms of high level commands (or keywords) defined in the keyword processor. The overall integrated platform of the present invention is automated and does not require manual re-writing of the test scripts as various components of the SUT are modified. Indeed, all changes are performed at the model level, which triggers the automatic re-generation of configuration files and test scripts.

In one embodiment, the present invention comprises an arrangement for providing integrated, model-based testing of industrial systems in the form of a model-based test design module, responsive to manual inputs in the form of use cases and models, for automatically creating test scripts, configuration information and deployment information associated with a specific industrial system being evaluated, a test execution engine, responsive to the test scripts created by the model-based test design module to generate commands for controlling various hardware and software components of the specific industrial system and an automated test infrastructure (ATI) component coupled to the specific industrial system and responsive to the commands generated by the test execution engine for testing and evaluating the specific industrial system, the automated test infrastructure including a keyword processor, responsive to the commands, for implementing the testing of the specific industrial system and an ATI launcher, responsive to the deployment information created by the model-based test design module, for defining arrangements of components forming the specific industrial system to be tested.

Other and further embodiments and arrangements of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
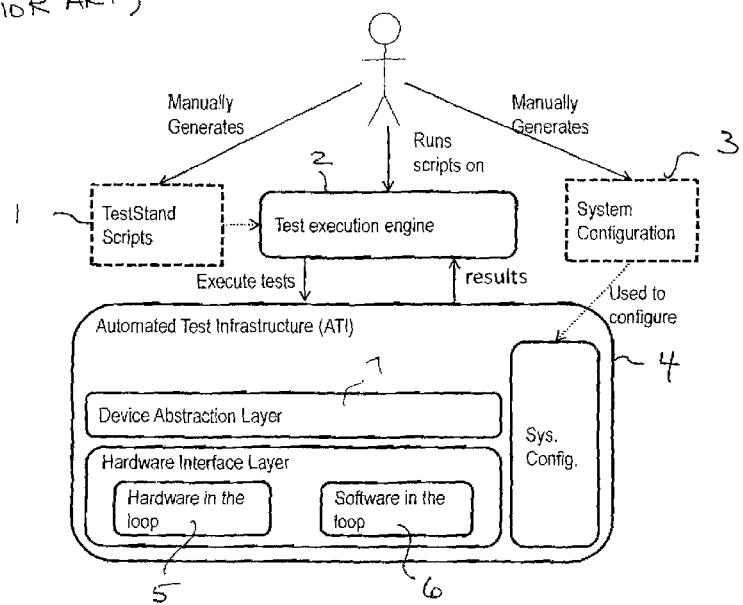
FIG. 1 is a block diagram of a typical prior art arrangement that uses engineering personnel to manually generate test scripts that are used by a conventional test execution engine.

Mechatronics can be defined as a design philosophy that utilizes a synergistic integration of mechanics, electronics and computer technology in the design of products or systems. As a result of the complex nature of these arrangements, the development of an automated testing platform requires the consideration of various issues that had not previously been of a concern in the development of testing platforms for purely software-based systems. Besides the traditional logic model (based on data and control elements found in software), mechatronic systems must also deal with physical components and simulated elements. Moreover, the data associated with mechatronic systems is not always discrete—it may include continuous (analog) signals as well as real-time constraints.

Additionally, since mechatronic systems are likely to be "re-used" in the context of product lines being employed in different situations, the testing platform needs to be able to cope with product variability (e.g., different vendors) and/or environment variability (e.g., different configurations and deployment arrangements). As mentioned above, the size and complexity of today's mechatronic systems results in an extremely heterogeneous mix of products, most likely supplied by different vendors. This requires that components be developed and tested before the actual system is finalized, creating the need for integrating simulated devices with actual components and testing this hybrid version of the system.

As will be described in detail below, the integrated automated testing platform of the present invention addresses these various concerns in the form of a keyword-driven, model-based test approach that uses system models from the design phase for test purposes. In particular, it uses a test tool based on the unified model language (UML) as a modeling environment and test generator to create test sequences (scripts) as inputs for a test execution engine. The same tool is used to create a software representation reflecting the system setup and deployment (environment) details for a specific mechatronic system under test (SUT). One advantage of using a UML-based test tool for keyword-driven tests is the ability to model a mechatronic SUT in terms of high-level abstractions from which different combinations of executable test instructions can be automatically generated. This not only increases the accuracy and speed of test generation, but also simplifies the maintenance of tests that can be modified and regenerated in a timely fashion.

In particular, the present invention describes an approach for evaluating a mechatronic SUT that combines the three different approaches of the prior art, integrating them to provide: (1) the automatic generation of internal configurations (i.e., a set of sub-components and their interconnections) used to match different deployment and test scenario needs of the mechatronic SUT. The components of the specific mechatronic SUT can include actual hardware and/or simulated elements; (2) the automatic generation of deployment configurations at various scales of complexity, where selected components build up the test environment to be deployed; and (3) automatic generation of test scripts for testing the mechatronic SUT under different deployment arrangements and internal configurations, based on model-based system use case specifications.

Figure 2:
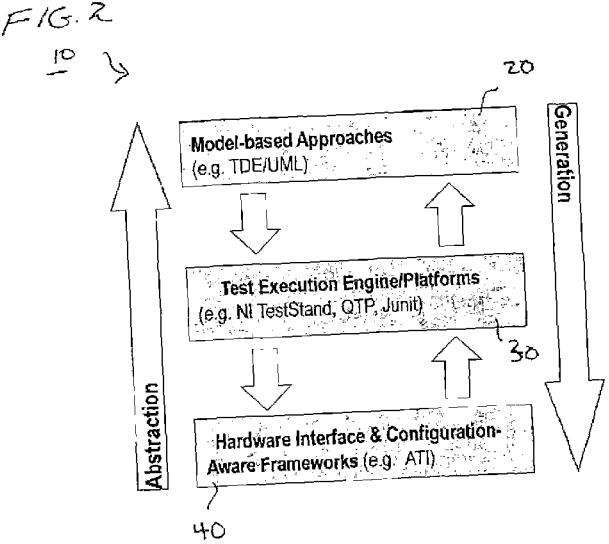
FIG. 2 is a diagram of an integrated model-based test (iMBT) architecture formed in accordance with the present invention.

FIG. 2 is a diagram illustrating an integrated model-based testing (iMBT) system 10 of the present invention, described as a three-layer platform including a high-level model-based test design layer 20 (also referred to hereinafter as a design "tool"), a test execution engine 30 and a low-level automated test infrastructure (ATI) 40. As indicated by the arrows in FIG. 2, the abstraction level of the layers increases from ATI layer 40 upwards to model-based test design layer 20, with the flow of information through system 10 moving downward (as shown by the generation arrow) from model-based test design layer 20 to ATI layer 40. As will be discussed in detail below, this approach automates the otherwise manual process of test script development, as well as automating the processes of defining various system configurations and deployment environments. The methodology as discussed in detail hereinbelow also facilitates the reuse of existing specification models that can be augmented with behavior data used for test, configuration and deployment generation. The outcome of this approach is higher levels of productivity, repeatability and automation than possible with prior art arrangements.

From an implementation perspective, test developers interact with and analyze a specific mechatronic SUT by means of models within design tool 20, using the models to define different system, configuration, data and deployment models defining the mechatronic SUT that are thereafter used by automated code generators to build test scripts and configurations. These scripts and configurations are then used as inputs to ATI layer 40 for use in analyzing the system. ATI layer 40 provides a set of interfaces and implementations that handle the communications between the test programs and the mechatronic SUT. As will be described in detail below, the automation facilitates the reuse of existing specification models that can be imported into design tool 20 and augmented with behavior data used for test, configuration and deployment generation. The outcome of the process of the present invention is higher levels of productivity, repeatability and automation when compared to the prior manual production of test scripts and configurations for testing.

Figure 3:
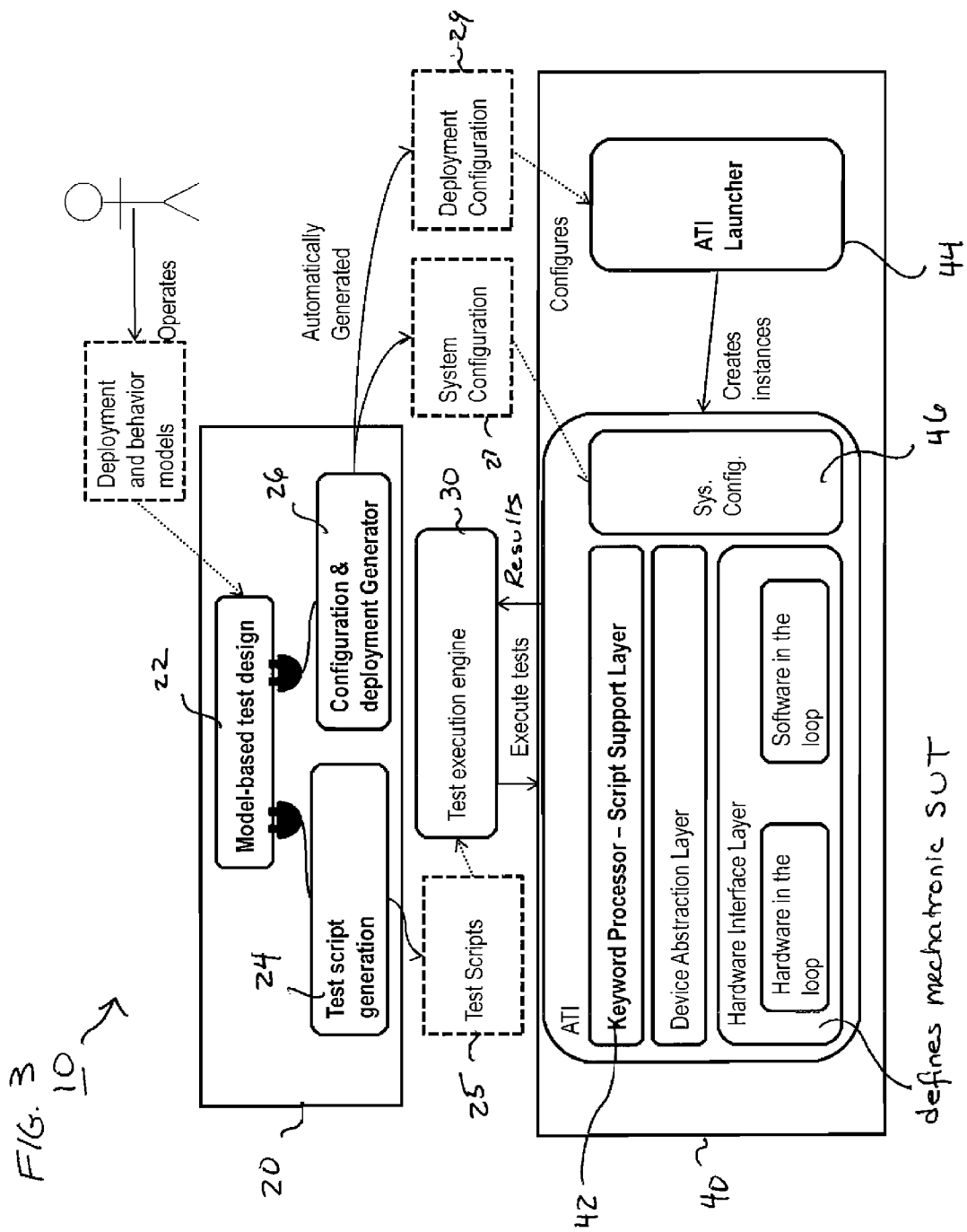
FIG. 3 is a detailed illustration of the process of using the iMBT system of the present invention.

FIG. 3 contains a diagram of an expanded view of test system 10 as shown in FIG. 2. In particular, model-based design layer 20 is shown as including a testing environment module 22 as previously used in MBT development, and supplemented by a test code generator 24 and a configuration and deployment generator 26. Test code generator 24 utilizes the behavior specification (as described below), annotated with the system data specification to produce a set of test scripts 25. As shown in FIG. 3, these scripts 25 are sent to test execution engine 30, which interprets test scripts 25 and generates method calls to the SUT via ATI 40. Configuration and deployment generator 26 translates configuration and deployment specifications into ATI configuration files 27 and deployment files 29. A configuration specification includes information about how the SUT sub-components are interconnected (i.e., "configured") and supplies this information as an input to a system configuration component 46 within ATI 40. The deployment specifications define the number of instances of each major system component (i.e., "deployment"), creating the deployment arrangements 29 that are sent to an ATI launcher 42 of ATI 40.

ATI layer 40 is shown in FIG. 3 as including an ATI launcher 42 and a keyword processor 44. ATI launcher 42 is responsive to the deployment configuration files 29 automatically generated by configuration and deployment generator 26 to create multiple ATI instances, based on the generated deployment configuration file. Thus, ATI launcher 42 is responsible for managing the deployment of all the components in various, distributed settings. This is important in cases where multiple instances of the SUT and its clients (test executors) must be loaded, allowing the possibility to create multiple simulated deployment scenarios.

Importantly, ATI layer 40 must also be configured and extended to support a keyword processor 44, tailored to the specific mechatronic SUT, as well as the sub-components representing hardware and software elements of the mechatronic SUT. In particular, keyword processor 44 functions to provide an interface to the mechatronic SUT, defining a convenient set of domain-specific commands that are particularly designed for test purposes. The keyword processor interacts with the components represented in the mechatronic SUT, and also copes with the variability of the system (as related to multiple vendors, multiple configurations, environments, and the like). The method used by keyword processor 44 includes at least three different categories to put the mechatronic SUT in an initial state: (1) system set-up methods ("set" commands that select a particular mode of operation for the SUT); (2) system state verification methods ("sense" commands that check the state of the SUT); and (3) "action" commands that perform the data input and operations of the SUT. In each case, keyword processor 44 returns a Boolean status operator that indicates the success/failure of a specific test execution.

As mentioned above prior art testing situations required engineering personnel to manually develop the specific test situations required to fully test the capabilities of a mechatronic SUT (as shown in FIG. 1), as well as ensure that each possible configuration and deployment was analyzed. As the complexity of mechatronic systems continues to increase, it has become practically impossible to identify the various suites of conditions that need to be evaluated to fully test, verify and validate any given system. Thus, in accordance with the present invention, design layer 20 is supplemented with additional modules 28 that are utilized to automate this test design process.

Figure 4:
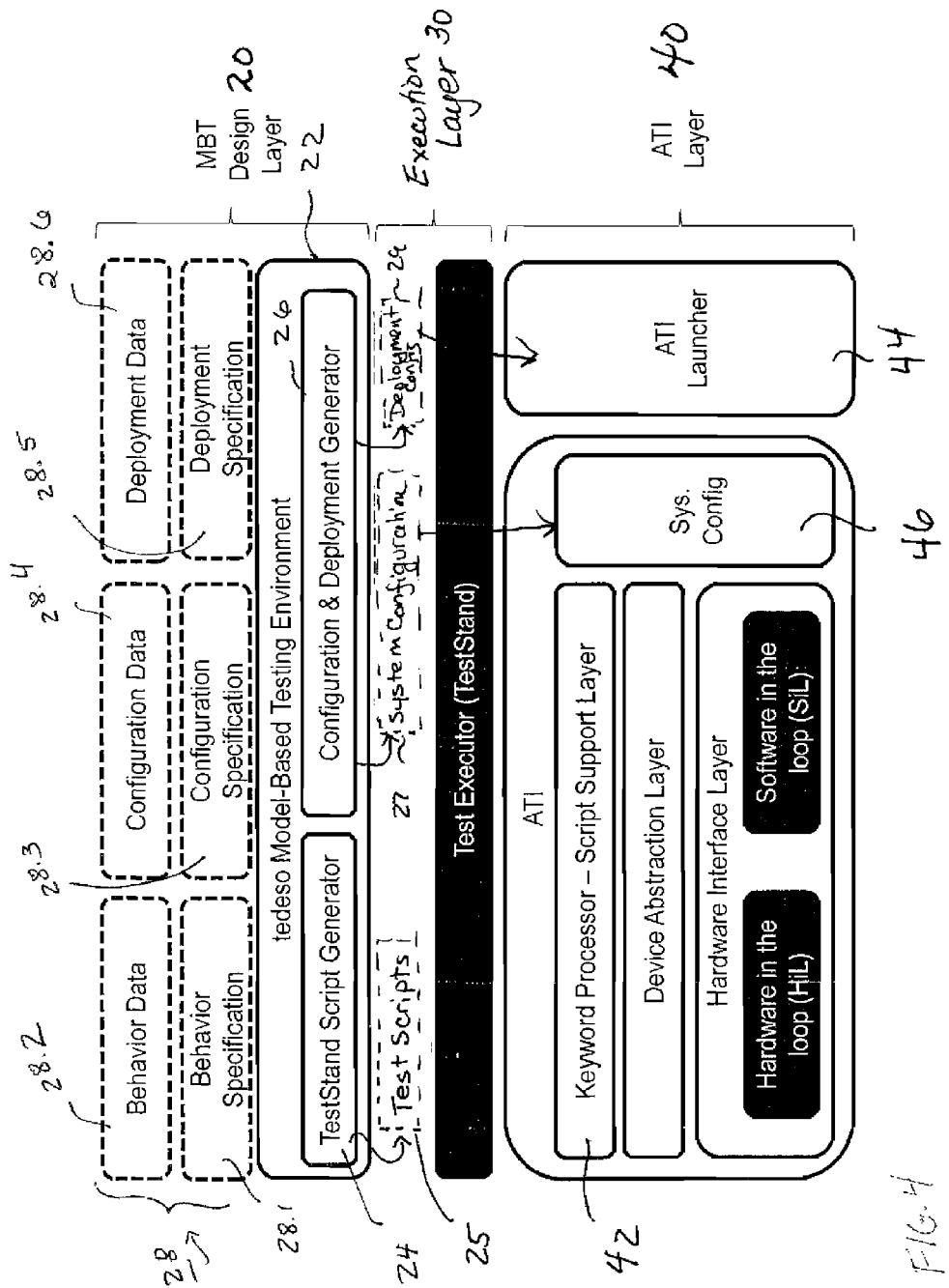
FIG. 4 is a diagram showing additional aspects of the test model design portion of the iMBT system of the present invention.

FIG. 4 is a detailed illustration of the architecture of iMBT system 10 of the present invention that particularly defines modules 28. As shown, modules 28 include a behavior specification component 28.1, a behavior data component 28.2, a configuration specification component 28.3, a configuration data component 28.4, a deployment specification component 28.5 and a deployment data component 28.6, where each of these components will be described in turn below.

Behavior specification component 28.1 defines the expected behavior of the mechatronic SUT, based on use cases and activity diagrams. In particular, behavior specification component 28.1 specifies sequences of steps, decision nodes, transitions and alternative paths in the various scenarios that the mechatronic SUT must be able to support. In one exemplary embodiment, standard UML 2.0 activity diagrams can be used to express the behavior of the mechatronic SUT. Behavior data component 28.2 includes a detailed set of the behavior data that is used during various phases of testing the system. In particular, conventional testing environment module 22 uses a category partition model which prescribes a set of categories (data classes) and choices (data instances) of these categories. When associated to behavior models by means of notes, categories are used to produce tests that cover different sets of choices and/or paths and decision nodes in the models. The result is a set of test procedures that is used to derive executable test code 25 by test code generator 24. The system data specification is implemented by a slightly modified UML 2.0 class diagram.

Configuration specification component 28.3 represents the sub-components of the mechatronic SUT and their relations. In an example where the mechatronic SUT is an alarm system for an industrial complex, the various components, buses and user interface elements forming the alarm system are defined by a configuration specification. Again, the configuration specification is specified with the use UML 2.0 component model. Configuration data component 28.4 is used to annotate configuration specification component 28.3 with information necessary to set up each component/sub-system within the mechatronic SUT. For example, IP addresses, polling intervals, log level options, enable/disable, etc are all configuration data elements. The configuration data is connected to the configuration specification through the use of notes. As shown, components 28.3 and 28.4 are used as part of configuration and deployment generator 26 to automatically generate the system configuration file 27, used as an input to the system configuration portion 46 of ATI 40.

Deployment specification component 28.5 represents concerns related to the number of component instances in the mechatronic SUT, as well as their arrangement throughout the mechatronic SUT. Continuing with the same alarm scenario, the deployment specification may define the number of sensors and actuators connected to an alarm panel; in another case, the deployment specification may define the number of servers and clients interconnected in a computer network. Deployment data component 28.6 represents the information used to initialize the components in a deployment configuration, and to initialize instances of these components. For example, information about a host name, IP address, number of instances and initialization parameters used by a configuration manager may comprise the deployment data. As with the configuration data, the deployment data is implemented by a slightly modified UML 2.0 class diagram, as supported by test environment 22.

Deployment components 28.5 and 28.6 of module 28 are used as part of configuration and deployment generator 26 to automatically generate the deployment configuration file 29, which is thereafter used as an input to ATI launcher 44. As described above, these various deployment arrangements are used to create a variety of different "instances" of the mechatronic SUT that are required to be tested.

In summary, the automated approach to testing of mechatronic systems as described above is considered to be a significant advance over the prior art by creating an integrated test environment that utilizes the automated generation of test scripts, relieving the system test from the burden of manually generating tests and configurations. The separation between models, abstract test cases and executable code allows the use of different test execution engines, independent of the technology used. Thus, the test execution engine is able to utilize different technologies to communicate with the SUT, which is independent at the model and abstract test levels. The inclusion of a keyword processor in accordance with the present invention provides a common interface to the mechatronic SUT, facilitating the code generation process, as well as isolating the model-based testing aspect from the specific implementation of the mechatronic SUT. The separation between component interfaces and implementations in the ATI also supports strategies such as SiL, and copes well with external dependencies and heterogeneity. Finally, the combination of behavior and configuration models as part of the initial test generation process supports multiple deployments and configurations without the need to redo the entire testing process (unless, of course, physical rewiring of the actual system is required).

Indeed, the integrated model-based testing (iMBT) arrangement of the present invention is considered to meet the needs of the following requirements: heterogeneity, incompleteness in final design, internal configurability, deployment configurability and maintainability. The iMBT system of the present invention is also considered as capable of handling additional non-functional requirements (for example, government regulations) and also has the ability to automatically execute test activities and prepare reports based on the testing.

Heterogeneity in this context refers to the fact that mechatronic systems not only have software system components that require testing, but also include hardware components (where for these purposes "hardware" is defined to also include conventional electro-mechanical pieces of equipment). In order to support the goal of automated testing, these diverse components must be accessible through software interfaces that support their automatic set-up, execution and monitoring.

In most cases, a given mechatronic system is not fully completed prior to the need to perform at least some level of automated testing. Indeed, it is usually the case that the components and sub-systems are produced by different vendors and many of the components may not be available during the early development states of a product. In this case, an automatic testing program needs to be able to simulate the specifications and reactions of the to-be-developed components. This aspect is hereinafter referred to as "incompleteness" of the automated testing system.

Mechatronic systems are many times designed as "product families", sharing commonalties while each particular system retains some individuality in terms of specific features unique to that system. The ability to recognize and share the testing systems developed for these common elements should significantly reduce the development time for a complete suite of products. This aspect is hereinafter referred to as "internal configurability" of the automated testing system.

The complete testing of mechatronic systems also includes the ability to evaluate the performance of the system in a variety of different deployment scenarios. For example, a surveillance system may be associated with a particular area of a building (such as a laboratory), an entire building, or a company-based campus of a number of different buildings. In this case, the surveillance system needs to be tested against each of these different deployment scenarios before it is actually installed in any of these environments. This aspect is defined as the "deployment configurability" of the iMBT system.

With respect to the aspect of "maintainability", it is desirable that the test infrastructure allows for the evolution of the mechatronic SUT with minimal impact on existing tests. That is, changes in non-relevant implementation details should not affect any of the existing test scripts and the infrastructure should include the ability to add new tests, for new features, at a minimal cost and disruption to the test environment. For the reasons discussed above, the iMBT system of the present invention is fully capable of handling these demands.

Mechatronic systems are often employed in support of "mission critical" activities—control of alarm systems, military projects, or the like. As such, they may be subject to different requirements and restrictions than conventional industrial environments (e.g., governmental regulations). Other examples of "non-functional requirements" include items such as: responsiveness (e.g., the system must respond to a certain alarm incident within 10 seconds), survivability (e.g., the system must gracefully survive a partial failure of its components and power sources), system load (including variable load conditions), resilience to failure (e.g., the system must be able to drive the outcome of events under different conditions), and the ability to generate responses (e.g., audio and/or visual) in association with catastrophic scenarios. These types of "non-functional requirements" are also supported in the iMBT system of the present invention by including means for validating the performance of the mechatronic system with respect to these non-functional requirements.

It is to be understood that one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system, or sold separately. It is obvious that when dealing with a full, complex software system, thousands of code entities and relationships must be analyzed and their attributes stored and recovered for later use in forming various different types of augmented design structure matrices, depending on a particular focusing metric. Only a computer system with sufficient hardware and software capabilities can perform these functions.

Additionally, at least one program storage device readable by a machine, tangibly embodying at least one program of instructions executable by machine to perform the capabilities of the present invention can be provided.

While the preferred embodiment to the invention has been described, it will be understood that those skilled in the art, both now and in the future, may make various improvements and enhancements which fall within the scope of the claims which follow. Indeed, as noted above, while the various features of the present invention have been described in detail in association with the visualization of a software system, the technique and tool is usable with any type of system that can be defined as a hierarchical tree structure, encompassing various branches and having terminating leaf nodes with relationships defined between the leaf nodes. Thus, the following claims are to be construed to maintain the proper protection for the invention first described.

What is claimed is:

1. An arrangement for providing integrated, model-based testing of industrial systems, the arrangement comprising:
a model-based test design module, responsive to manual inputs in the form of models, for automatically creating test scripts, configuration information and deployment information associated with a specific industrial system being evaluated;
a test execution engine, responsive to the test scripts created by the model-based test design module to generate commands for controlling various hardware and software components of the specific industrial system; and
an automated test infrastructure (ATI) component coupled to the specific industrial system and responsive to the commands generated by the test execution engine for testing and evaluating the specific industrial system, the automated test infrastructure including a keyword processor, responsive to the commands, for implementing the testing of the specific industrial system and an ATI launcher, responsive to the deployment information created by the model-based test design module, for defining arrangements of components forming the specific industrial system to be tested;
wherein the model-based test design module includes a test script generator component for creating test scripts applied as an input to the test execution engine, and a configuration and deployment generator for creating configuration and deploying information inputs to the ATI component.

2. The arrangement as defined in claim 1 wherein the ATI component further comprises a configuration system element, responsive to the configuration information created by the model-based test design module, to define a specific configuration of elements forming the industrial system being tested and evaluated.

3. The arrangement as defined in claim 1 wherein a unified model language (UML) is used to create the model inputs to the model-based test design module.

4. The arrangement as defined in claim 1 wherein the model-based test design module includes a design automation module including behavior, configuration and deployment components for defining a suite of different scenarios associated with the specific industrial system being tested and evaluated.

5. The arrangement as defined in claim 4 wherein the behavior components include a behavior specification component that defines a set of paths through elements associated with the suite of different scenarios, and a behavior data component that comprises notes and specific data associated with the choices and paths.

6. The arrangement as defined in claim 4 wherein the configuration components include a configuration specification component defining sets of elements forming the specific industrial system and all possible relations therebetween, and a configuration data component including information to annotate the sets of elements.

7. The arrangement as defined in claim 4 wherein the deployment components include a deployment specification component defining a number of instances of each element within the specific industrial system and a deployment data component including information used to initialize each instance of the elements forming the specific industrial system.

8. The arrangement as defined in claim 1 wherein the specific industrial system comprises a mechatronic system including mechanical, electrical and computer elements.

9. A method of providing integrated model-based testing of a specific industrial system, the method comprising the steps of:
providing inputs to a model-based test design module in terms of use models and diagrams defining the specific industrial system;
automatically generating test scripts using a test script generator of the model-based test design module, based on the provided use models and diagrams, for use as inputs to a test execution engine in evaluating the specific industrial system;
automatically generating configuration and deployment information files using a configuration and deployment generator of the model-based test design module, based on the provided use models and diagrams, for use as inputs to an automated test infrastructure component;

configuring, by the test execution engine, the specific industrial system to be tested, including a number of instances of each element as deployed, and executing, by the automated test infrastructure component, the test scripts on the configured system, using a keyword processor to link the commands to the industrial system.

10. The method as defined in claim 9 wherein the automated test infrastructure component further comprises a configuration system element, responsive to the configuration information files generated by the model-based test design module, to define a specific configuration of elements forming the industrial system being tested and evaluated.

11. The method as defined in claim 9 wherein a unified model language (UML) is used to create the model inputs to the model-based test design module.

12. The method as defined in claim 9 wherein the model-based test design module includes a design automation module including behavior, configuration and deployment components for defining a suite of different scenarios associated with the specific industrial system being tested and evaluated.

13. The method as defined in claim 12 wherein the behavior components include a behavior specification component that defines a set of paths through elements associated with the suite of different scenarios, and a behavior data component that comprises notes and specific data associated with the choices and paths.

14. The method as defined in claim 12 wherein the configuration components include a configuration specification component defining sets of elements forming the specific industrial system and all possible relations therebetween, and a configuration data component including information to annotate the sets of elements.

15. The method as defined in claim 12 wherein the deployment components include a deployment specification component defining a number of instances of each element within the specific industrial system and a deployment data component including information used to initialize each instance of the elements forming the specific industrial system.

16. The method as defined in claim 9 wherein the specific industrial system comprises a mechatronic system including mechanical, electrical and computer elements.

17. An arrangement for providing integrated, model-based testing of industrial systems, the arrangement comprising:

a model-based test design module, responsive to manual inputs in the form of models, for automatically creating test scripts, configuration information and deployment information associated with a specific industrial system being evaluated;

a test execution engine, responsive to the test scripts created by the model-based test design module to generate commands for controlling various hardware and software components of the specific industrial system; and an automated test infrastructure (ATI) component coupled to the specific industrial system and responsive to the commands generated by the test execution engine for testing and evaluating the specific industrial system, the automated test infrastructure including a keyword processor, responsive to the commands, for implementing the testing of the specific industrial system and an ATI launcher, responsive to the deployment information created by the model-based test design module, for defining arrangements of components forming the specific industrial system to be tested;

wherein the model-based test design module includes a design automation module including behavior, configuration and deployment components for defining a suite of different scenarios associated with the specific industrial system being tested and evaluated, and further wherein the behavior components include a behavior specification component that defines a set of paths through elements associated with the suite of different scenarios, and a behavior data component that comprises notes and specific data associated with the choices and paths.

\* \* \* \* \*